United States Patent Office 2,960,478
Patented Nov. 15, 1960

2,960,478
PROCESS FOR SIMULTANEOUSLY PRODUCING PELLETED AND FLUID CRACKING CATALYSTS FROM CLAYS

Alfred J. Robinson, Scotch Plains, N.J., assignor to Minerals & Chemicals Philipp Corporation, a corporation of Maryland No Drawing. Filed July 25, 1956, Ser. No. 599,922

2 Claims. (Cl. 252—450)

This invention relates to the preparation of adsorptive contact masses of more than one size classification from naturally occurring clays. More particularly, the invention relates to a process by means of which contact masses suitable in size range, and other desirable properties, for use as catalysts in the well-known fixed or moving bed hydrocarbon cracking processes and contact masses suitable as catalysts in fluid hydrocarbon cracking processes are produced concurrently from kaolinitic clays. Although, as stated above, the adsorptive contact masses of my invention are especially useful as hydrocarbon conversion catalysts in well-known cracking processes, they are also useful as adsorbents for decolorizing vegetable and mineral oils and for various other purposes.

The above-mentioned hydrocarbon cracking processes are employed, as is well known, for the purpose of converting petroleum hydrocarbons to gasoline.

In fixed bed cracking, the hydrocarbon vapors are passed through a stationary bed of catalyst particles, while in moving bed cracking processes, as exemplified by thermofor catalytic cracking (T.C.C.) and Houdriflow operations, the catalyst particles gravitate towards the base of the reactor from whence they are conveyed through regenerators and back to the top of the reaction zone for another pass therethrough. The Houdriflow process differs from the T.C.C. process in the manner of conveying regenerated catalyst particles for recirculation to the reactor, a gas lift being used in the former case and elevators in the latter. Catalyst particles for fixed and moving bed processes are relatively coarse, ranging in size from about 10-mesh to about 4-mesh, and usually in the form of pellets or "beads."

In fluid hydrocarbon cracking processes, the catalyst is suspended in the stream of hydrocarbon vapors in the reactor and hence should ideally be of small enough particle size to permit this and yet not of such fineness as to be carried out with the effluent vapors. Experience has shown that fluid catalysts should consist of particles preferably within the size range of from about 20 to about 150 microns in equivalent diameter but, in any case, with not more than about 20 percent of its weight made up of particles finer than about 40 microns.

In the process of the present invention, the clay to be converted to the adsorptive contact masses is reacted with sulfuric acid and the reacted mixture is finally calcined at a temperature, or temperatures, sufficiently high to decompose aluminum sulfate therein (formed as a result of the reaction) thereby to produce a high quality adsorptive contact material particularly suitable as a hydrocarbon conversion catalyst.

The process of my invention comprises a novel combination of operating steps, which will be disclosed thereinafter, whereby relatively coarse adsorptive contact masses, such as, for example, those of suitable for use as fixed bed or moving bed cracking catalysts, and finely divided spherical contact masses, of suitable size to serve as fluid cracking catalysts, are produced concurrently from a naturally occurring clay. Finely divided spherical contact masses such as those produced in our present process are conventionally referred to in the art as microspheres. The term spherical, as used herein, is intended to include within its meaning not only those shapes which are truly spherical but also shapes which approach the spherical as, for example, those which are sometimes referred to as spheroidal.

Insofar as I am aware, there is no known process of converting clays to adsorptive contact masses whereby a relatively coarse product of suitable particle size for use as a fixed or moving bed cracking catalyst is produced simultaneously with a separate product, in the form of microspheres, suitable as a fluid cracking catalyst.

I am, of course, aware of the great number of prior art processes for converting clays to adsorptive contact masses suitable as cracking catalysts. These prior art processes have comprised, for the most part, "acid leaching" procedures in which clay and acid are reacted and then soluble reaction products are removed from the reaction mixture by aqueous leaching. My new process includes a clay activation procedure which is entirely different in principle from the prior art acid leaching methods since removal of clay components such as occurs in said acid leaching methods is not essential thereto.

I am also aware of the prior art techniques for producing fluid catalysts from sub-bentonite clays by merely grinding coarse catalyst masses such as pellets, which have been produced by conventional acid leaching treatment of said calys, to powders of particle size satisfactory for the purpose. The microspheres of my process are entirely different from the aforesaid powdered fluid catalysts in that they are spherical-shaped masses, which are products of an integral part of my process, and not merely "ground pellets" such as might be obtained by simply diverting a portion of my coarser product to grinders for reduction thereof to a powdered material of fluid catalyst particle size range. Microspheres are greatly to be desired over ground powders as fluid cracking catalysts, one reason being that they are much less amenable to attrition losses in use than are said powders. The reason why ground particles are more vulnerable to attrition losses than are microspheres is probably because their rough surfaces contain projecting corners and other irregularities which are easily knocked off when said particles collide, the fines resulting from this "rounding off" of the particles while in use exiting with the effluent vapors and thus being lost to the system.

The preferred method of forming the microspheres of my process, which method will be described hereinafter, differs from prior art methods of forming spherical masses from clays (and similar types of materials) such as, for example, the spray drying of slurries in hot air or other gases and the formation of hydrosol spheres in organic liquids which subsequently set to hydrogels therein.

It is thus a principal object of my invention to provide a novel process for simultaneously converting kaolinitic clays to relatively coarse adsorptive contact masses suitable as fixed or moving bed cracking catalysts and to microspheres suitable as fixed cracking catalysts.

It is another object of the invention to provide a novel process for simultaneously converting kaolinitic clays to relatively coarse adsorptive contact masses suitable as fixed or moving bed cracking catalysts and microspheres suitable as fluid cracking catalysts, without recourse to troublesome acid leaching treatment as heretofore used in the activation of clays.

It is another object of the invention to provide a novel process for simultaneously converting kaolinitic clays to relatively coarse adsorptive contact masses suitable as fixed or moving bed cracking catalysts and microspheres suitable as fluid cracking catalysts, in which the microspheres are formed by a new and improved procedure.

It is still another object of the invention to simultaneously provide new and improved adsorptive contact masses suitable as fixed or moving bed cracking catalysts and microspheres suitable as fluid cracking catalysts.

Other objects and features of the invention will be apparent from the description thereof which follows.

As previously noted, the process of the present invention is intended primarily for use on kaolin clays, by which is meant those naturally occurring clays containing kaolinite as the chief mineral constituent. The approximate chemical composition of kaolinite is represented by the formula: $Al_2O_3 \cdot 2SiO_2 \cdot 2H_2O$. The weight ratio of $SiO_2$ to $Al_2O_3$, indicated by this formula, is 1.18 and kaolin clays normally possess $SiO_2/Al_2O_3$ ratios of from 1.0 to 1.5.

While I prefer to use degritted raw clay (that which has been refined only to the extent that grit, foreign bodies and clots of undispersed clay have been eliminated) as a starting material in my process, I wish to have it clearly understood that the invention is not limited to the treatment of such a product. Clays which have received other preliminary treatments may still be amenable to processing in accordance with the teachings herein. Examples of preliminary treatments falling within this category are de-ironing by physical or chemical methods, conventional classifying operations and, even partial acid activation by the previously mentioned wet procedures. The volatile matter content (V.M.) of the starting clay should preferably not be so high as to make too dilute a mixture of clay and acid for optimum handling under the conditions of the particular processing involved. I have obtained excellent results using a starting clay of about 14 percent V.M. with moderate dosages of concentrated sulfuric acid.

In putting the process of my invention into practice, kaolin clay and sulfuric acid are first mixed to an appearance of homogeneity in any apparatus suitable for the purpose, as for example, a pug mill. In the preferred embodiment of the process, the clay-acid mixture is extruded to form pellets, or otherwise shaped into masses within the desired size range, and the pellets or shaped masses are then immersed and aged in a hydrocarbon liquid, such as oil, under such conditions of time and temperature as to bring about substantially complete reaction of clay and acid. This aging of the pellets or other shaped masses may be accomplished, for example, in a screw conveyer, said pellets being conveyed therethrough (at a rate such as to afford adequate reaction time) while immersed in the hydrocarbon liquid maintained at the desired temperature.

The solids from the screw conveyer or other suitable aging apparatus, along with a certain amount of accompanying oil, are passed to a screening or other suitable classifying operation to separate the substantially unbroken pellets from fragments of damaged pellets, undersized pellets, and fine materials which are always present in the system as a result of attrition in the aging apparatus; imperfect operation of the auger mill, or other pellet forming apparatus, with accompanying production of undersize pellets; cracking and breaking apart of weak pellets; etc. Hereinafter, for simplicity's sake, the relatively coarse pellet fragments, undersize pellets and fine material which are screened or otherwise separated from the substantially whole pellets, following aging thereof, will be referred to as "fines."

After removal of the fines from the oil-aged material, the substantially whole pellets thus obtained are subjected to calcination treatment to effect desulfation thereof with attendant conversion of said pellets to the adsorptive contact masses which are one of the final products of our novel process. The term pellets, as used herein, except as otherwise noted, is intended to include within its meaning not only extruded pellets but also other suitably shaped masses, of the same order of size which have been formed by methods well-known to those in the art.

The fines which have been screened, or otherwise classified, from the oil-aged mixture are separated from the oil accompanying them by any suitable means. A preferred way of accomplishing this is to permit the fines to settle in the oil, as a result of which the clarified oil can be recirculated to the system, or otherwise disposed of, and the settled fines can be recovered.

The thus "de-oiled" fines are next dispersed in water to form a slurry, which slurry is then spray-dried or otherwise formed into dried substantially spherical particles of the desired size range. If it is desirable to form microspheres from a greater proportion of the clay-acid solids than that represented by the fines (particularly where the proportion of fines is small or insignificant) a portion of the substantially whole pellets may be dispersed in water, either along with or separate from said fines, for subsequent spray drying or otherwise converting to microspheres. It may, at times, be desirable to grind the solids prior to dispersing them in the water. In my preferred embodiment I form dried microspheres from the dispersed slurry of fines by a novel procedure comprising dispersion of said slurry in a hot organic liquid of a type hereinafter specified. By this procedure, the slurry is formed into tiny droplets from which water is vaporized by the heat from the oil leaving dried or partially dried spherical masses behind which are thereafter separated from the organic liquid and passed to the next stage of processing.

The dried spheres are finally calcined at a temperature, or temperatures, sufficiently high to decompose aluminum sulfate therein and to thus convert them to adsorptive contact microspheres particularly suitably as fluid hydrocarbon cracking catalysts.

I prefer to use concentrated sulfuric acid, such as commercially available 66° Bé. (about 93 percent $H_2SO_4$) grade, for the clay-acid reaction of my process, water being added, if necessary, to facilitate ease of pugging, or otherwise mixing, the ingredients. However, any strength acid consistent with proper plasticity of mix for the dosage employed can be used within the scope of my invention. I prefer to use acid dosages from about 60 percent to about 100 percent in my process, acid dosage being defined as the weight of 100 percent acid per weight of volatile free clay expressed on a percentage basis. By volatile free clay is meant that which has been heated to essentially constant weight at about 1700° F.

Although acid dosages much lower than 60 percent, down to as low as 20 percent in fact, can be used in my process with some benefit, the clay conversion gradually falls off with decreasing dosage until ineffectual levels are reached. With the lower dosages of acid, it has been found necessary to have higher water/acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, very high acid dosages, particularly on a clay of relatively coarse particle size, sometimes produces a mixture too thin for adequate workability. In this event, the situation can frequently be remedied by either grinding the clay prior to acid addition or by substituting fuming sulfuric acid for the more dilute acid conventionally used. Although my preferred range of acid dosage has been given as that from about 60 percent to about 100 percent, dosages higher than 100 percent can be used within the scope of my invention so long as a workable mix is obtainable in the process. Approximately 130 percent dosage represents the amount of acid that would be theoretically required for substantially complete reaction with an average kaolin clay, although amounts in excess of this can be used within the scope of my invention.

As previously indicated, the mixture of clay and acid is preferably formed into masses of appropriate size by extrusion or equivalent method before the oil aging step of my process. The forming operation can be performed by extrusion, pilling or any equivalent method known to those in the art, my preferred method being extrusion by means of an auger mill. For best results in extrusion, the V.M. of the mix should be between about 30 and about 65 percent, with the preferred range being from 50 to 55 percent.

The oil for the oil aging step of my process should preferably be a hydrocarbon oil and it must be of such character as to be liquid and substantially non-reactive with sulfuric acid at aging temperatures, although minor amounts of matter capable of reaction with the acid can be tolerated. Hydrocarbons suitable for my improved process should preferably have low vapor pressures at aging temperatures, but I do not wish to exclude the possibility of using lower boiling liquids in conjunction with a condenser system to prevent or sharply curtail vapor losses. Example of readily available hydrocarbon liquids which are suitable for my process are saturated aliphatic higher molecular weight hydrocarbons which have been treated with sulfuric acid for removal of sulfonatable components such as, for example, certain white mineral oils. Kerosenes can also be used ase aging mediums in my process with condenser systems.

I have experimentally determined that optimum temperatures for my oil aging step fall within the limits of from about 220° to about 400° F. and optimum times of aging within the range from 1 to 24 hours, with the time required depending on the temperature used. I prefer to age within the temperature range from 275° F. to 325° F. for from one to five hours. When aging temperatures become too high, the clay-acid reaction proceeds rapidly and the final product is excessively soft. When aging temperatures are too low, the product is also soft but in this case the cause seems to stem from insufficient reaction due to a very slow reaction rate.

As previously stated, I prefer to accomplish my oil aging treatment in screw conveyors. However, any well-known means of maintaining the clay-acid mixture in the hot oil for the desired length of time would obviously fall within the scope of my invention. The oil bath may be either static or circulating for my purpose.

After undergoing oil aging, the solids can be conveyed by any suitable means to the screening, or equivalent, operation for separation of the pellets from the fines. Where a sufficient amount of oil accompanies the aged material, the solids-oil mixture can be satisfactorily conveyed by pipe-line, using a torque-flow solids pump where necessary, to the aforesaid screening, or equivalent, operation. Torque-flow solids pumps are particularly suitable for transporting solids-liquid suspensions with a minimum of damage to the suspended solids. I have found a Wemco torque-flow solids pump (a product of Western Machine Company of San Francisco, California) to be very satisfactory for purposes of pumping my mixtures of pellets and oil.

Calcination of the substantially undamaged pellets, after the fines have been separated therefrom, should be carried out preferably at a temperature of from about 900° F. to about 1600° F., depending on the atmosphere, and for a time preferably not greater than about 24 hours. While I do not wish to exclude all calcination temperatures outside of the range started, I would like to make clear that at temperatures much below 900° F. the aluminum sulfate decomposition may be incomplete and that temperatures above 1600° F. may manifest themselves in lowered activity of the final product.

The organic liquid in which the aqueous slurry prepared from the fines is dispersed in accordance with the preferred teachings of my invention, should preferably be a hydrocarbon liquid, such as straight petroleum distillate. A hydrocarbon oil of a type suitable for my oil aging step may be used. Thus we have found saturated aliphatic higher molecular weight hydrocarbons which have been treated with sulfuric acid for removal of sulfonatable compounds such as, for example, white mineral oils, to be suitable for my purpose; as in the case of the oil aging, kerosene can be employed as the dispersion medium in conjunction with a condenser system.

The oil in which the aqueous slurries of my process are dispersed should preferably be maintained at temperature levels within the range from about 250° to about 500° F. in order to obtain optimum conditions for removal of moisture from the discrete spherical globules of dispersed slurry. I have found that at lower temperatures, such as those below about 250° F., poor spheres are formed. While satisfactory spherical masses can be formed from suitable organic liquids maintained at temperatures in excess of 500° F., it is preferred to utilize temperatures lower than this for economic reasons.

The optimum solids content of the slurry to be dispersed can easily be determined for any particular process by routine experimentation. Such solids content will depend to a certain extent on process variable such as, for example, the acid dosage used and it will also depend on the method employed to accomplish the dispersing operation.

As hereinbefore mentioned, my invention is particularly suitable for producing, as one of its products, a cracking catalyst of spherical shape and of a size suitable for commercial fluid hydrocarbon cracking processes. By proper control of conditions under which the aqueous slurry is dispersed, spherical catalysts of this size range may be obtained. Thus, where the dispersing step is carried out by spraying the slurry, the size of the spherical particles may be varied, as will be recognized by those skilled in the art, by control of the feed rate, solids content of the feed slurry, type of atomization, and possibly other mechanical factors. Also the temperature of the hot hydrocarbon liquid will influence the particle size of the microspheres, in general the higher the temperature the smaller the particles. It should be pointed out, however, that if the spherical particles are too large, it can be theorized that the rapid vaporization of the water therefrom as they are dispersed in the hot oil will weaken them and in severe cases cause them to fracture.

It is necessary to maintain the spherical particles in the hot hydrocarbon liquid only for a time sufficient to vaporize most of the free moisture from the material. This is accomplished within a very short time such as within a few seconds after the reacted clay-acid material contacts the hot liquid; however, if desired the spherical particles may be permitted to remain in the hot liquid for a period of time thereafter without detrimental results.

The shaped contact masses of the desired particle size are then removed from the hot hydrocarbon liquid and subjected to calcination under time and temperature conditions such as to decompose aluminum sulfate therein and render the product substantially sulfate free. Here again, as in the case of the calcination of the pellets, temperatures within the range from about 900° F. to about 1600° F., depending on the calcination atmosphere, and times up to 24 hours are usually sufficient. Although there appears to be some evidence that desulfation, under ideal operating conditions, could be accomplished in a matter of minutes or perhaps even seconds, I prefer to calcine for periods within the range from about ½ hour to about 4 hours or longer, the time required in any particular case depending on the calcination temperature, the atmosphere in the calciner, etc.

It is, of course, within the scope of my process to preheat the microspheres (or the pellets) prior to subjecting them to the calcination temperatures desired for desulfation. The preheating can be accomplished in any well-known manner as for example, by holding the materials at a relatively low temperature (compared to desulfation temperatures) for a predetermined period of time or by slowly, over a prolonged period of time, heating the materials to the desired calcination temperature level.

It is within the scope of my invention to incorporate not more than about 10 percent, on a total weight of mix basis, of a combustible filler into the clay-acid mixture of my process. This filler, among other things, serves to increase the porosity of the final catalyst since it is eliminated during the calcination step leaving voids in its place. The filler can be added to the clay prior to the extrusion, or other pellet forming operation, and/or to the aqueous slurry of fines prior to dispersion thereof to form microspheres. Examples of fillers suitable for my process are wood flour, corn meal, sawdust, carbon and the like.

Following are examples included for purposes of illustrating the process of my invention. These examples are not to be construed as limiting the process to the particular embodiments described therein.

Example I

This is an example of a plant-scale practice of the process of my invention.

Water-washed Georgia kaolin clay was continuously mixed with sulfuric acid of about 93.2 percent concentration, the amount of acid used being equivalent to a dosage of about 80 percent. The clay and acid were mixed by pugging.

The admixture of clay and acid was continuously formed into pellets about 3/16 inch in diameter and about 3/16 inch long by extrusion using an auger mill.

The extruded pellets were aged in oil maintained at a temperature of about 300° F. by being slowly conveyed therethrough with screw conveyors. The retention time of the pellets in the hot aging oil was about three hours.

The aged pellets were continuously discharged from the bottom of the screw conveyor troughs, along with a substantial quantity of oil, and the mixture of oil and aged solids (both whole pellets and fines) was pumped through a pipe, by means of a Wemco torque-flow solids pump, and discharged onto a screen.

The substantially whole pellets were screened from the fines and conveyed by bucket elevator to a feed hopper in the upper portion of a vertical calciner. From the feed hopper the pellets gradually fed onto a bed of pellets supported in the central part of the calciner, through which bed steam and hot flue gases containing reducing components (products from the combustion of gas in a deficiency of oxygen) were continuously circulated upward. The pellets in the calciner gravitated downward through the bed and then passed through downcomers adjacent the bottom of said bed into the lower portion of said calciner. Pellets were continuously drawn from said lower portion of the calciner and thus a steady downward flow of pellets was maintained through the unit.

The pellets were substantially desulfated in the vertical calciner, the heat required for this coming from the hot gases passing upward through the pellet bed. During the operation of the calciner the temperature in the bottom of the pellet bed averaged about 1430° F.

The desulfated pellets from the vertical calciner were high grade adsorptive contact masses suitable for use as cracking catalysts in fixed or moving bed hydrocarbon cracking operations.

The mixtures of fines and oil from the aforesaid screening operation are passed to a sump in which the fines are permitted to settle. The thickened fines from the sump are slurried in water. The clarified oil is recovered from the sump for recirculation to the aging operation. The oil in which the pellets were aged for the present example was a white mineral oil having a flash point of about 390° F.

The aqueous slurry prepared from the fines is fed to a rotating wheel-type atomizer so positioned as to discharge said slurry, as a spray, into the walls of a vortex of swirling white mineral oil maintained at a temperature of about 350° F. to 360° F. The hot oil quickly dries the fine droplets of slurry and converts said droplets to solid masses of substantially microsphere size range.

The spherical masses are recovered from the oil, ignited to burn off oil, and calcined in a carbon monoxide atmosphere at 1400° F. for three hours thereby to yield microspheres which are substantially sulfate-free and of good quality, being particularly suitable as a fluid hydrocarbon cracking catalyst.

The adsorptive contact masses of the present example were evaluated as cracking catalysts by the CAT-A test for catalytic activity.

The well-known CAT-A test comprises a procedure described by J. Alexander and H. G. Shimp in an article on page R537 of National Petroleum News, Technical Section, August 2, 1944. In this method, a standard light East Texas gas oil is contacted at a rate of 5 cc. per minute for 10 minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. endpoint gasoline distilled from the aforesaid cracked product, corrected for 100 percent recovery, expressed as a percentage of the volume of gas oil charged. As part of the CAT-A test, the weight of coke deposited on the catalyst, weight of gas produced and gas specific gravity are determined. The coke and gas weights are expressed as percentages of gas oil charged. Two CAT-A cycles are run with only the data from the second cycle being used since experience has shown these data to be sound. In general the ratio of N.L.B. gasoline yield to coke yield should exceed about 9/1 or 10/1; gas gravity should be at least 1.2 or higher.

CAT-A results for this example are below:

TABLE I

| | |
|---|---|
| N.L.B. gasoline yield | percent__ 32.0 |
| Coke yield | do____ 2.9 |
| Gas yield | do____ 6.4 |
| Gas gravity | 1.35 |

The above results show that the present example produced an excellent cracking catalyst. The gasoline yield, as one skilled in the art will recognize, was completely satisfactory for commercial purposes as were the ratio of gasoline yield to coke yield and the gas gravity.

Example II

This example was in all respects similar to Example I with the excepton that the average temperature in the bottom of the pellet bed in the vertical calciner during desulfation of the pellets was 1480° F.

The CAT-A results are below:

TABLE II

| | |
|---|---|
| N.L.B. gasoline yield | percent__ 30.8 |
| Coke yield | do____ 2.7 |
| Gas yield | do____ 6.0 |
| Gas gravity | 1.31 |

The above results show that, here again as in Example I, an excellent commercial catalyst was produced.

I claim:
1. A process for the simultaneous preparation of relatively coarse adsorptive contact masses and of relatively fine spherical adsorptive contact masses from kaolin clay comprising mixing kaolin clay with sulfuric acid in an amount to provide from 60 percent to 130 percent by weight of $H_2SO_4$ based on the volatile free weight of said kaolin clay, forming relatively coarse masses from the resulting clay-acid mixture, aging the coarse clay-acid masses in white mineral oil maintained within the temperature range from about 220° to about 400° F. for one to twenty-four hours, separating substantially whole clay-acid masses from fines which accumulated, substantially eliminating sulfate from the whole masses by calcining said whole masses at a temperature of from 900° F. to 1600° F., forming an aqueous slurry of the fines which were separated from the whole masses, dispersing said aqueous slurry in white mineral oil maintained within the temperature range from 250° to 500° F. to form spherical particles of a size substantially smaller than said coarse masses and, finally, substantially eliminating sulfate from said spherical particles by calcining them at a temperature of from 900° F. to 1600° F.

2. The process of claim 1 in which the relatively coarse masses of the clay-acid mixture are formed by extrusion.

References Cited in the file of this patent

UNITED STATES PATENTS

| | | |
|---|---|---|
| 1,642,871 | Chappell et al. | Sept. 20, 1927 |
| 2,192,000 | Wilson | Feb. 27, 1940 |
| 2,459,903 | Voorhees | Jan. 25, 1949 |
| 2,485,626 | Mills | Oct. 25, 1949 |
| 2,563,977 | Van Horn et al. | Aug. 14, 1951 |